United States Patent
Schraeder et al.

(10) Patent No.: US 9,242,325 B2
(45) Date of Patent: Jan. 26, 2016

(54) SECURING DEVICE FOR SECURING A CHUCK ON A ROTATING SPINDLE

(75) Inventors: Philipp Schraeder, Mengen (DE); Alexander Holstein, Heiligkreuztal (DE)

(73) Assignee: SCHUNK GMBH & CO. KG SPANN-UND GREIFTECHNIK, Lauffen am Neckar (DE)

( * ) Notice: Subject to any disclaimer, the term of this patent is extended or adjusted under 35 U.S.C. 154(b) by 594 days.

(21) Appl. No.: 13/638,649

(22) PCT Filed: Mar. 16, 2011

(86) PCT No.: PCT/EP2011/053997
§ 371 (c)(1),
(2), (4) Date: Dec. 13, 2012

(87) PCT Pub. No.: WO2011/120810
PCT Pub. Date: Oct. 6, 2011

(65) Prior Publication Data
US 2013/0075984 A1    Mar. 28, 2013

(30) Foreign Application Priority Data

Apr. 1, 2010 (DE) .................... 20 2010 014 139 U
Sep. 20, 2010 (DE) ..................... 10 2010 041 055

(51) Int. Cl.
*B23B 31/36* (2006.01)
*B23Q 3/12* (2006.01)
(Continued)

(52) U.S. Cl.
CPC ............ *B23Q 3/12* (2013.01); *B23B 31/16004* (2013.01); *B23B 31/36* (2013.01);
(Continued)

(58) Field of Classification Search
CPC B23B 31/36; B23B 31/201; B23B 31/16004; B23Q 31/12; B23Q 31/183
USPC ........... 279/2.02, 2.03, 71–73, 110, 114–116, 279/133, 141
See application file for complete search history.

(56) References Cited

U.S. PATENT DOCUMENTS 1,108,514 A * 8/1914 Koontz ..................... 408/176
1,766,276 A * 6/1930 Berg ........................ 279/115
(Continued)

FOREIGN PATENT DOCUMENTS

| CN | 1426868 A | 7/2003 |
| CN | 1157275 C | 7/2004 |

(Continued)

OTHER PUBLICATIONS

English translation of Notice of Reasons for Rejection for Japanese Patent Application No. 2013-501735 dated Jul. 9, 2014 (5 pages).

(Continued)

*Primary Examiner* — Eric A Gates
(74) *Attorney, Agent, or Firm* — Michael Best & Friedrich LLP (57) ABSTRACT

The invention concerns a securing device for securing a chuck, in particular a power-operated chuck, on a rotating spindle of a machine, wherein a rotating element and at least one chucking-slide assembly are provided in a main body in such a way that, when the rotating element turns, the chucking-slide assemblies change their radial position such that, in a chucking position, they force the chuck against the securing device in the axial direction.

8 Claims, 6 Drawing Sheets

(51) Int. Cl.
*B23B 31/163* (2006.01)
*B23Q 3/18* (2006.01)

(52) U.S. Cl.
CPC .......... *B23Q 3/183* (2013.01); *Y10T 279/1004* (2015.01); *Y10T 279/17717* (2015.01); *Y10T 279/19* (2015.01); *Y10T 279/1926* (2015.01); *Y10T 279/26* (2015.01); *Y10T 279/33* (2015.01); *Y10T 279/34* (2015.01)

(56) References Cited

U.S. PATENT DOCUMENTS

| | | | | |
|---|---|---|---|---|
| 2,475,861 | A * | 7/1949 | Thalmann | 279/71 |
| 2,723,861 | A | 11/1955 | Eisler | |
| 3,682,491 | A * | 8/1972 | Sakazaki et al. | 279/124 |
| 3,874,688 | A * | 4/1975 | Schiller | 279/50 |
| 4,688,810 | A | 8/1987 | Waite | |
| 4,833,955 | A | 5/1989 | Oki et al. | |
| 5,186,476 | A * | 2/1993 | Heel et al. | 279/2.03 |
| 5,340,130 | A * | 8/1994 | Gorse | 279/110 |
| 5,964,556 | A | 10/1999 | Toyomoto | |
| 6,220,608 | B1 * | 4/2001 | Varnau | 279/114 |
| 6,599,068 | B1 * | 7/2003 | Miyazawa | 409/234 |
| 7,284,938 | B1 * | 10/2007 | Miyazawa | 409/231 |
| 7,584,971 | B2 * | 9/2009 | Weller | 279/93 |
| 7,938,408 | B2 * | 5/2011 | Haimer | 279/102 |
| 8,132,816 | B2 * | 3/2012 | Norton et al. | 279/2.19 |
| 8,209,840 | B2 * | 7/2012 | Norton | 29/428 |
| 2005/0013675 | A1 | 1/2005 | Bengston et al. | |

FOREIGN PATENT DOCUMENTS

| | | | |
|---|---|---|---|
| CN | 1586776 A | 3/2005 | |
| CN | 100344407 C | 10/2007 | |
| CN | 101267905 A | 9/2008 | |
| CN | 101502886 A | 8/2009 | |
| CN | 101633125 A | 1/2010 | |
| DE | 724892 C | 9/1942 | |
| DE | 4302655 A1 | 9/1993 | |
| DE | 10032073 A1 | 3/2003 | |
| EP | 0244667 A2 | 11/1987 | |
| EP | 272394 A1 * | 6/1988 | ............ B23B 31/28 |
| EP | 0339282 A2 | 11/1989 | |
| EP | 1275468 A1 | 1/2003 | |
| EP | 1295675 A1 | 3/2003 | |
| JP | 63074508 | 5/1988 | |
| JP | 03019608 | 1/1991 | |
| JP | 0639339 | 2/1994 | |
| JP | 10071512 | 3/1998 | |
| WO | 94/23871 A1 | 10/1994 | |
| WO | 0176814 | 10/2001 | |
| WO | 0176815 | 10/2001 | |

OTHER PUBLICATIONS

International Search Report for Application No. PCT/EP2011/053997 dated Sep. 5, 2011 (3 pages).
International Search Report for Application No. PCT/EP2011/054000 dated Sep. 5, 2011 (3 pages).
Notification of the First Office Action from State Intellectual Property Office of People's Republic of China received in Chinese Patent Application No. 201180017868.7, mailed May 30, 2014.

* cited by examiner

SECURING DEVICE FOR SECURING A CHUCK ON A ROTATING SPINDLE

The invention relates to a securing device for securing a power-operable chuck on a rotating spindle of a machine, the chuck including a tension adapter motionally coupled to chuck jaws, and a tension tube coupleable to the tension adapter being provided on the machine side. Typically, a chuck piston is moved in the axial direction via the tension tube displaceable in the axial direction and is motionally coupled to the chuck jaws via a suitable mechanism in such a way that, when the tension tube or chuck piston is moved axially, the chuck jaws are moved in the radial direction. Consequently, via a tension tube of this type, workpieces to be received by the chuck can be tensioned in an automated way.

To connect the tension tube to the chuck piston, it is known to provide on the chuck a tension adapter which is screwed releasably to the tension tube via a thread. Forces can be sufficiently transmitted in the axial direction via a thread of this type.

If the chuck is to be exchanged on a corresponding machine, this entails comparatively high outlay. First, securing screws have to be released which connect the chuck to a spindle flange. Moreover, the tension adapter has to be unscrewed from the tension tube. This is comparatively time-consuming.

The object on which the present invention is based, therefore, is to propose a securing device of the type initially mentioned, which permits a simple and rapid change of a chuck on a rotary spindle of a machine.

A securing device of this type is distinguished, in particular, in that a rotary member and chucking slides are provided in a basic body of the securing device in such a way that, when the rotary member is rotated, the chucking slides change their radial position, so that, in a chucking position, they load the chuck in the axial direction against the securing device. The invention has the advantage, in particular, that reliable securing is made possible in a comparatively simple way. Moreover, it may be advantageous that, if power-operable chucks are used, the tension adapter does not have to be unscrewed from the tension tube, as in the known prior art. Instead, the rotary member is merely actuated. The rotary member, in turn, actuates the chucking slides which act, for example, upon provided coupling portions in such a way that the tension adapter can be removed from the tension tube, in particular, in the axial direction. The basic body is secured on the rotating spindle, in particular, by securing means, such as, for example, securing screws. According to the invention, a plurality of rotary members and/or chucking slides may be provided.

However, the invention is not to be restricted to power-operable chucks, but is also to embrace manually operable systems.

Additionally, the basic body provides a chuck reception portion, and, in a particularly radially outer locking position, the chucking slides engage into the chuck reception portion for locking the chuck with the securing device. The chucking slides have a double function. In the radially inner or outer release position, they actuate the coupling portions for removing the tension adapter from the tension tube. In the radially outer or inner position in which the coupling portions couple the tension adapter to the tension tube, moreover, the chuck is locked on the securing device, which is secured to the rotating spindle. For this purpose, the chucking slides engage into the chuck reception portion into which the chuck then at least partially projects.

When the chuck is being locked on the securing device, suitable centering may take place via correspondingly provided centering means.

In order to allow simple rotation of the rotary member, a control means motionally coupled to the rotary member and displaceable tangentially with respect to the rotary member may be provided. Consequently, by the tangential displacement of the control means, a rotational movement can be introduced into the rotary member.

For the radial displacement of the control means, it is advantageous if the control means has a threaded bore and if an adjusting screw is provided, via which the control means can be displaced. The adjusting screw provides, in particular, a spindle thread which engages into the threaded bore. When the adjusting screw is rotated, the control means then travels along the adjusting screw in the tangential direction and causes the rotary member to rotate. The adjusting screw is, in particular, hand-operable. It is consequently conceivable that, by the adjusting screw being rotated, the chucking slides can be transferred from the locking position into the release position, and vice versa.

For guiding the radial movement of the chucking slides, it is advantageous if these are arranged in the basic body so as to be guided displaceably in the radial direction. Advantageously, each pair of chucking slides lie symmetrically opposite one another are provided.

The rotary member as such may be designed, in particular, as a rotary ring which is preferably arranged so as to run concentrically about the longitudinal mid-axis.

For the motional coupling of the rotary member to the chucking slides, it is conceivable that the rotary member comprises control curves or control cams, and that the chucking slides have control cams or control curves corresponding to the control curves or control cams. A radial movement of the chucking slides can thereby be obtained from the rotational movement of the rotary member. The control curves run preferably obliquely with respect to a radial line or, in order to achieve a bias, along a correspondingly curved line.

Furthermore, it is advantageous if the portion of the chucking slides which engages into the chuck reception portion has a slope, via which guide the chuck against the securing device when the chucking slides are displaced into the locking position. It can consequently be ensured, via the slopes, that the chuck comes to bear, in particular over a large area, under axial force against the securing device.

Moreover, the object initially mentioned is achieved by means of a securing system having the features of claim 10. The securing system of this type includes a securing device according to the invention, a rotating spindle, a tension tube and a chuck power-operable via the tension tube. The securing system is distinguished, in particular, in that coupling portions actuable by means of the chucking slides are provided on the tension adapter of the chuck or on the machine-side tension tube, counter portions which cooperate with the coupling portions being provided on the tension tube or on the tension adapter. The coupling portions and counter portions are designed in such a way that, in the locking position, the coupling portions cooperate with the counter portions in such a way that the tension adapter can be actuated in the axial direction by the tension tube. In the release position of the chucking slides, the tension adapter can then be removed from the tension tube.

The coupling portions are preferably designed as tongue portions formed in one piece with the tension adapter or the tension tube and elastically flexible in the radial direction. The tongue portions form solid state joints which can be formed in one part or in one piece with the tension adapter or the tension tube. The tongue portions extend in the axial direction and are of comparatively slender form so that they have good elastically flexible properties.

The tongue portions preferably have noses which project in the radial direction and which match with the counter portions. The counter portions may be designed, in particular, as groove clearances or as a continuous groove into which the noses engage in the locking position. In the release position, the tongue portions are then elastically deformed radially inwardly to an extent such that the noses are disengaged from the counter portions and axial removal of the chuck is possible.

The chucking slides are preferably designed such that in each case a chucking slide actuates a plurality of adjacent tongue portions. The advantage of this is that a comparatively large number of tongue portions can be actuated by means of comparatively few chucking slides.

It is advantageous, further, if the chuck reception portion is of ring-like design and if the chuck has a chucking ring for introduction into the chuck reception portion. The chucking ring may, in particular, provide a continuous annular groove in such a way that the chucking slides engage in the locking position into the annular groove and the chuck is consequently held reliably on the securing device. The annular groove may have a particularly conical surface contour running obliquely with respect to the longitudinal mid-axis, specifically in such a way that, when the chucking slides are displaced into the locking position, the chucking ring and consequently the chuck are drawn toward the securing device.

Further details and advantageous refinements of the invention may be gathered from the following description, by means of which an exemplary embodiment of the invention is described and explained in more detail.

In the drawing:

FIGS. 9a and b show various views of a rotary member of the securing portion;

FIG. 13a shows a section corresponding to FIG. 6 without a tension tube and tension adaptor, but with a chuck body receptacle;

FIG. 13b shows an enlarged detail from FIG. 13a;

FIG. 14b shows an enlarged detail from FIG. 14a;

FIG. 15a shows a section corresponding to FIG. 13a through a further embodiment;

FIG. 15b shows an enlarged detail from FIG. 15a;

FIG. 16a shows a section corresponding to FIG. 13a through a further embodiment; and FIG. 16b shows an enlarged detail from FIG. 16a.

Figure 1:
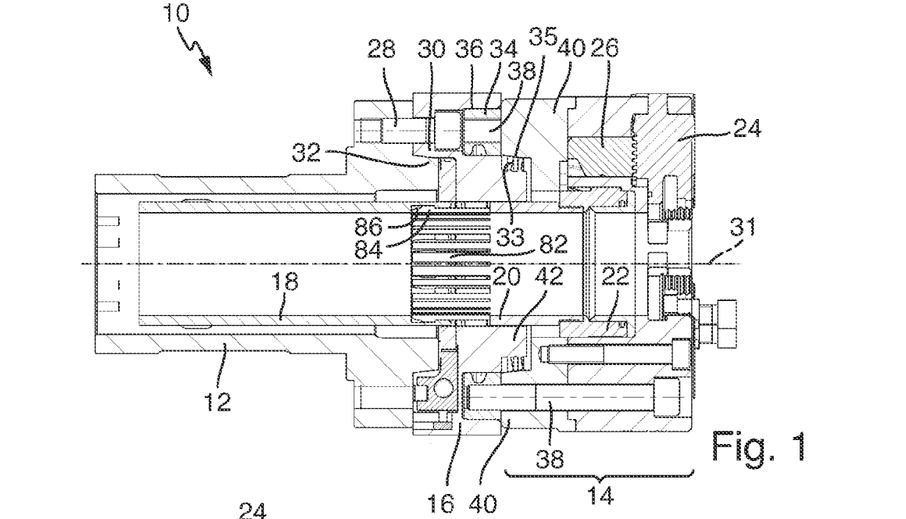
FIG. 1 shows a longitudinal section through a locking device with a securing portion.

FIG. 1 shows a securing system 10, which may also be designated as a locking device, which includes a machine-side rotating spindle 12, a chuck 14 and a securing portion in the form of a securing device 16, by means of which the chuck 14 is secured on the rotating spindle 12. Furthermore, a machine-side tension tube 18 is provided, which actuates a chucking piston 22 in the axial direction via a chuck-side tension adapter 20. The chucking piston 22 is motionally coupled to chuck jaws 24 which are movable toward and away from one another and can be seen clearly in the view according to FIG. 2. Motional coupling is such that axial displacement of the chucking piston 22 via mechanical actuators 26 causes radial movement of the chuck jaws 24 toward one another and away from one another. The chuck 14 or its chuck jaws 24 can consequently be power-operated via axial movement of the tension tube 20.

The securing device 16 has in the middle region a central perforation 29. The longitudinal mid-axis is identified by reference symbol 31.

As becomes clear from FIG. 1, the securing device 16 is secured to the rotating spindle 12 via fastening screws 28. To center the securing device 16, the latter has an inner surface 30 which cooperates with a spindle-side outer surface 32. To center the chuck 14 on the securing device 16, the securing device 16 has a conical portion 33 which cooperates with a chuck-side counter conical portion 35. The conical portion 33 and the counter conical portion 35 form a centering device 100.

The chuck 14 has, on its side facing the securing device 16, a chucking ring 34 which is received within a chuck reception portion 36 of ring-like design. As likewise becomes clear from FIG. 1, the chucking ring 34 is screwed to a chuck receptacle 40 by means of securing screws 38.

Figures 2, 3:
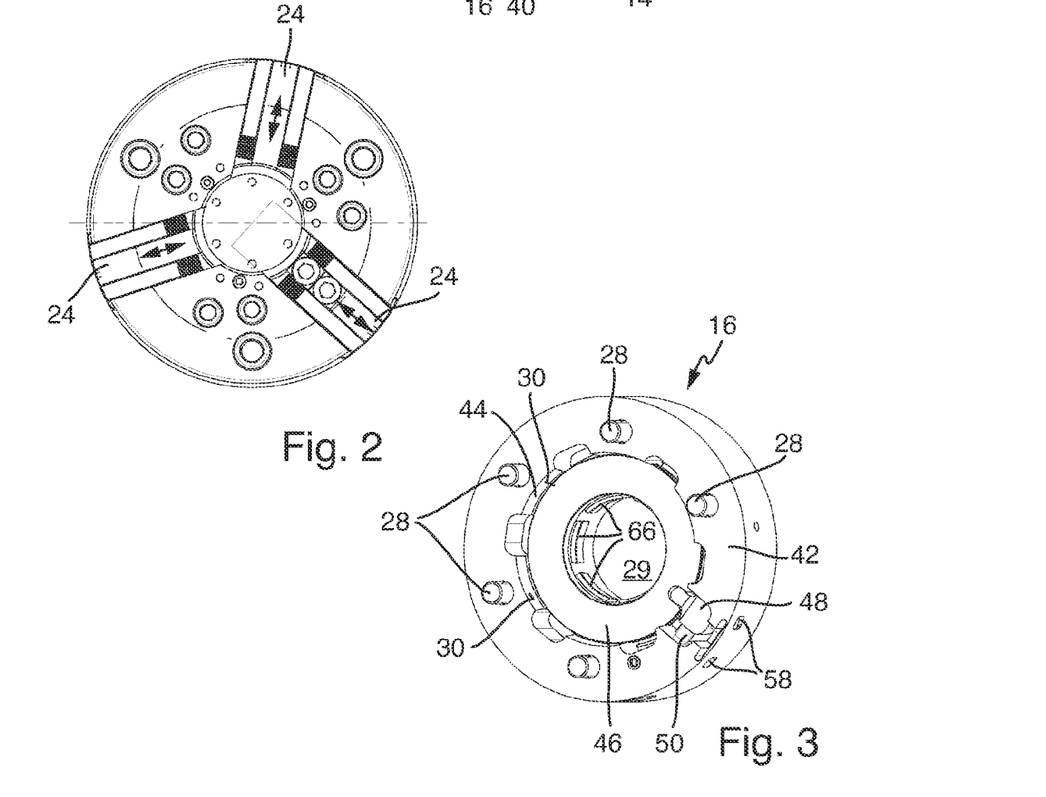
FIG. 2 shows a front view of the securing portion according to FIG. 1 toward the chuck.
FIG. 3 shows the securing portion shown in FIG. 1 as a subassembly.

The securing device 16 is illustrated in FIG. 3 as a separate subassembly. It can be seen here that the securing device 16 has a basic body 42 which receives the securing screws 28. Furthermore, the inner surface 30 is likewise formed by the basic body 42.

Figure 4A:
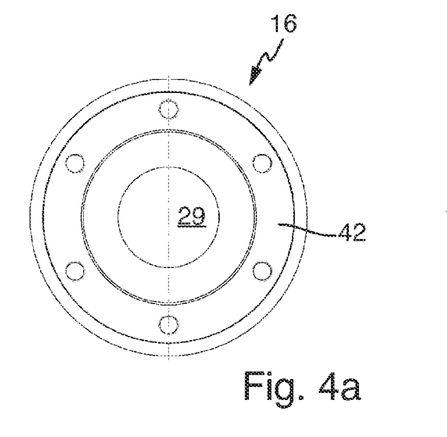
FIGS. 4a, b, c show various views of the securing portion according to FIG. 3 in a locking position.
Figure 4B:
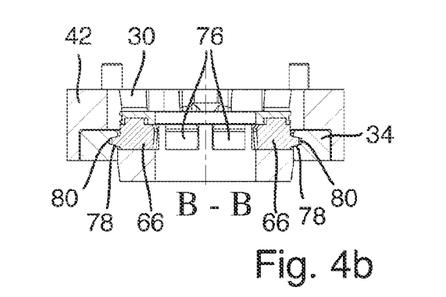
Figure 4C:
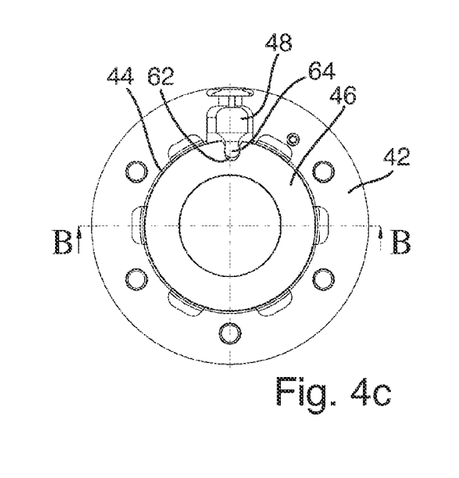
Figure 5A:
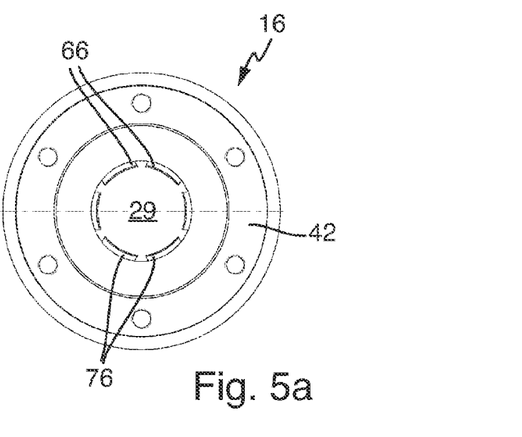
FIGS. 5a, b, c shows various views of the securing portion according to FIG. 3 in a release position.
Figure 5B:
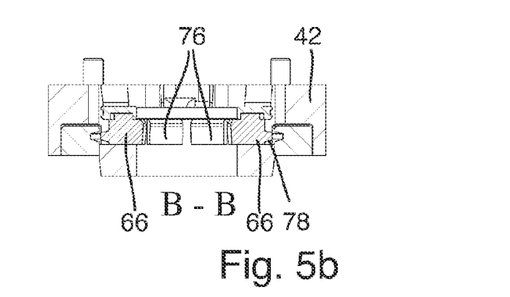
Figure 5C:
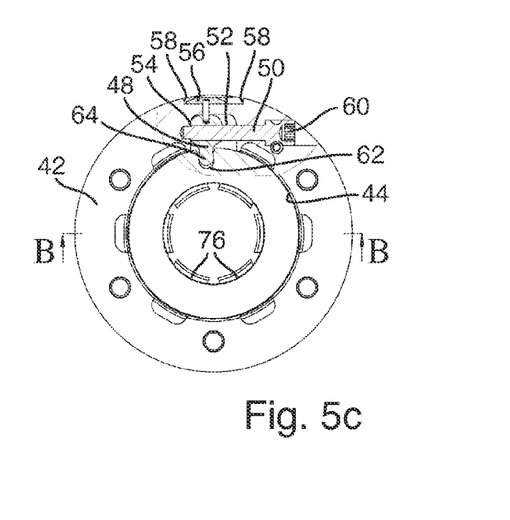

As becomes clear particularly from FIGS. 3, 4 and 5, the basic body 42 has, on its side facing the rotating spindle 12, a ring receptacle 44 in which a rotary member 46 in the form of a rotary ring is arranged so as to be rotatably mounted. To rotate the rotary member 46, a control means motionally coupled to the rotary member 46 and in the form of a control piston 48 is provided. As becomes clear particularly from FIG. 5c, the control piston 48 can be displaced in the tangential direction along an adjusting screw 50. The adjusting screw 50 has a spindle thread 52 which cooperates with an internal thread 54 of the control piston 48 in such a way that, when the adjusting screw 50 is rotated, the control piston 48 is moved in a longitudinal direction of the adjusting screw 50. To indicate the position of the control piston 48, the control piston 48 has provided on it a sight slide 56, the position of which can be detected visually through viewing windows 58 provided on the basic body 42.

The adjusting screw 50 has at its accessible end an actuating portion 60, into which a particularly manually rotatable screwdriver can be introduced for the purpose of rotating the adjusting screw 50. For the motional coupling of the control piston 48 to the rotary member 46, the rotary member 46 has a cam clearance 62 into which the control piston-side cam 64 engages.

The rotary member 46 is motionally coupled to locking means in the form of chucking slides 66 in such a way that, when the rotary member 46 is rotated, the chucking slides 66 change their radial position and can be transferred from a radially outer locking position into a radially inner release position. FIGS. 4a, 4b and 4c show the radially outer locking position of the chucking slides 66. FIGS. 5a, 5b and 5c show the radially inner release position of the chucking slides 66.

Figures 9A, 9B:
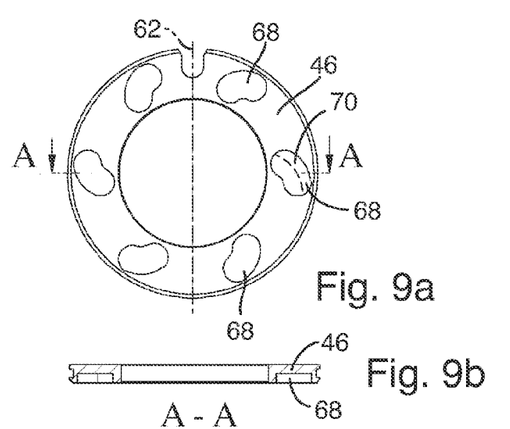
Figure 10:
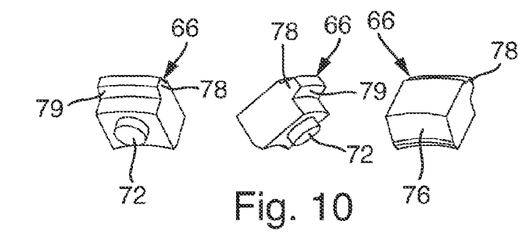
FIG. 10 shows various views of a chucking slide of the securing portion.
Figure 11A:
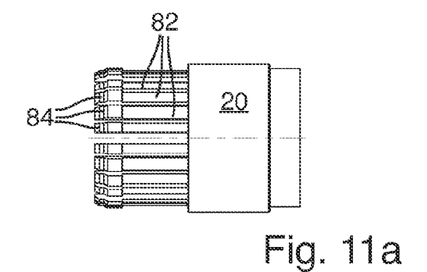
FIGS. 11a and b show various views of a tension adaptor of the securing portion.
Figure 11B:
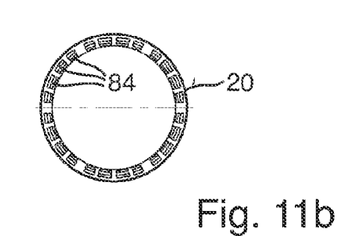

For the motional coupling of the rotary member 46 to the chucking slides 66, the rotary member 46 has, on its top side facing the chucking slides 66, recesses in the form of control curves 68. These control curves 68 can be seen clearly in FIGS. 9a and 9b which show the rotary member 46 as an individual part. The control curves 68 have in each case a slightly curved axis 70 which is such that the rotary member 46 is biased into the radially outer locking position. Each of the chucking slides 66, which are illustrated as an individual part in FIG. 10, have, on the side facing the rotary member 46, a control cam 72 which cooperates in each case with a control curve 68. The chucking slides 66 as such are mounted in guide grooves 74 in the basic body 42 such that the chucking slides 66 are displaceable in the radial direction of the basic body 42. This becomes clear particularly from FIG. 8c where the guide grooves 74 for the respective chucking slides 66 can be seen clearly.

Figure 8A:
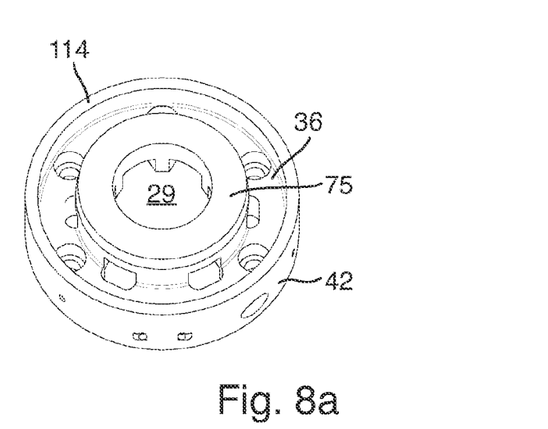
FIGS. 8a, b, c show various views of a basic body of the securing portion.
Figure 8B:
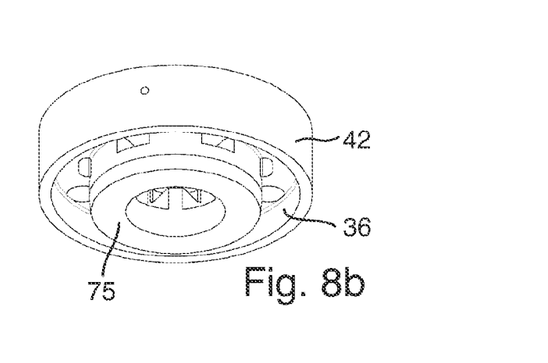
Figure 8C:
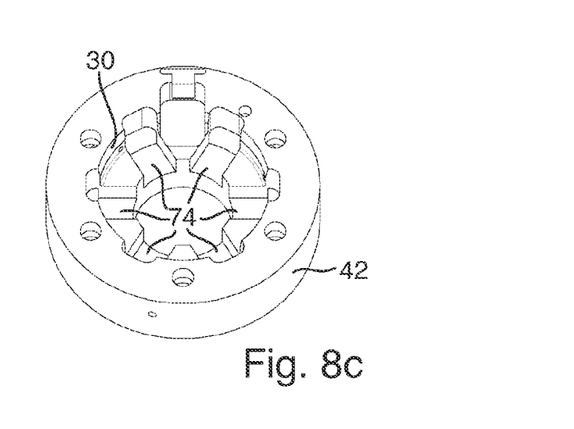

As becomes clear from FIG. 8, the basic body 42 has an internal continuous annular wall 75 which defines the central perforation 29 on the radially inner side and the ring-like chuck reception portion 36 on the radially outer side. The guide grooves 74 extend through the annular wall 75, so that the chucking slides 66, depending on position, engage into the region of the central perforation 29 (release position) or into the chuck reception portion 36 (locking position).

Figure 12A:
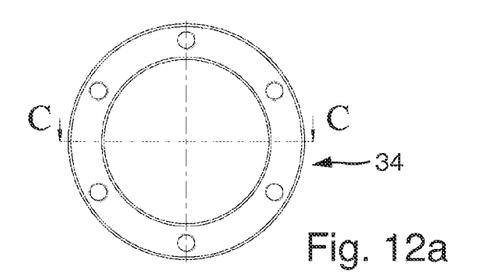
FIG. 12 shows various views of a chucking ring of the rotating spindle.
Figure 12B:
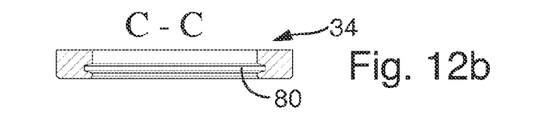

The chucking slides 66 have a radially inner portion 76 and a radially outer portion 78. As becomes clear from FIG. 4b, the radially outer portion 78 of V-shaped design in cross section has draw-in slopes 79 and, in the locking position, engages into a continuous annular groove 80 which is provided on the chucking ring 34 and which likewise has a V-shaped cross section. The annular groove 80 can be seen clearly particularly in FIGS. 12a and 12b in which the chucking ring 34 is illustrated as an individual part. Owing to the slopes 79, the chuck 14 is loaded against the securing device 16 during the displacement of the chucking slides 66 into the radially outer locking position. Reliable locking of the chucking ring 34 in the locking position on the securing device 16 is thereby achieved.

As becomes clear from FIG. 5b in which the chucking slides 66 are in the radially inner release position, the portions 78 are disengaged from the annular groove 80, so that the chuck 14 together with the chucking ring 34 can be extracted from the securing device 16.

When the securing device 16 is in the installed state, the basic body 42 surrounds the tension adapter 20, as becomes clear from FIG. 1. In FIG. 1, a sectional plane is selected in which the chucking slides do not lie and are therefore also not illustrated.

Figure 6:
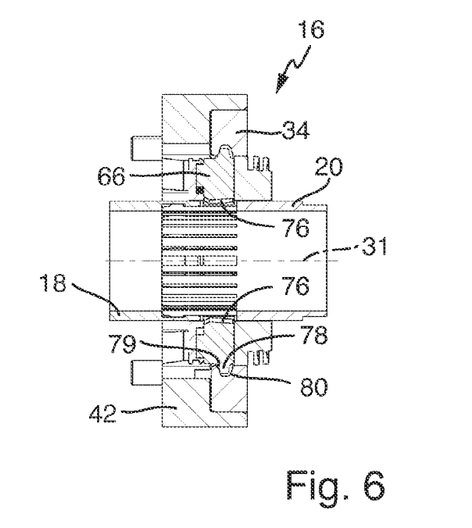
FIG. 6 shows a section through the securing portion according to FIG. 3 with a tension tube and tension adapter.
Figure 7:
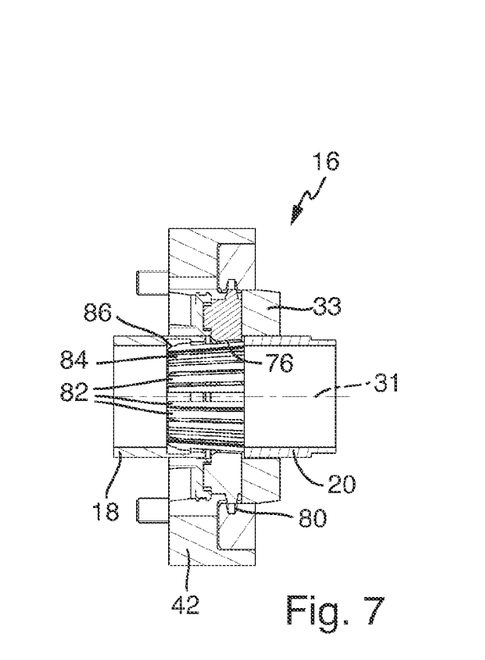
FIG. 7 shows a section corresponding to FIG. 6 in the release position.

FIGS. 6 and 7 illustrate the securing device 16 as an individual part with a portion of the tension tube 18 and of the tension adapter 20 in a section in which the chucking slides 66 can be seen. FIG. 6 shows the locking position; the chuck-side chucking ring 34 is held, locked on the securing device 16, via the chucking slides 66. As becomes clear from FIG. 6, FIG. 7 and also FIG. 11 which shows the tension adapter 20 as an individual part, the tension adapter 20 has, on the side facing the tension tube 18, coupling portions 82 in the form of tongue portions formed in one piece with the tension adapter 20 and elastically flexible in the radial direction. The tongue portions extend in the axial direction and are elastically flexible in the radial direction. The tongue portions have in the region of their free end noses 84 pointing radially outward. As can be seen clearly in FIG. 1 and FIG. 6, these noses 84 engage into a tension tube-side counter portion 86 which is designed as a continuous groove. The tongue portions arranged on the tension adapter 20 in such a way that, as becomes clear from FIG. 7, they are elastically deformed radially inwardly in the radially inner release position of the chucking slides 66. Deformation occurs to an extent such that the noses 84 are disengaged from the counter portions 86 and the tension adapter 20 together with the chuck 14 can then be removed in the axial direction. The chucking slides 66 consequently have a double function; on the one hand, their portions 78 are disengaged from the chucking ring 34 and, on the other hand, they actuate the tongue portions 82, so that their noses 84 are disengaged from the counter portions 86. The chuck 14 can then be removed.

In the exemplary embodiment illustrated in the figures, the coupling portion including the tongue portions 82 is arranged on the tension adapter 20 and the counter portion 86 is arranged on the tension tube 18. According to the invention, the coupling portion may also be provided on the tension tube 18 and the counter portion 86 on the tension adapter 20. The arrangement is then such that the chucking slides 66 actuate the tension tube-side coupling portions in order to make it possible to remove the chuck together with the tension adapter 20.

The described securing device 16 or entire securing system 10 has the advantage that the chuck 14 can be exchanged by adjusting only one screw, to be precise the adjusting screw 50. By the adjusting screw 50 being adjusted, on the one hand, the lock between the chucking slides 66 and the chucking ring 34 is released and, on the other hand, the coupling of the tension tube 18 to the tension adapter 20 is released.

Figures 13A, 13B:
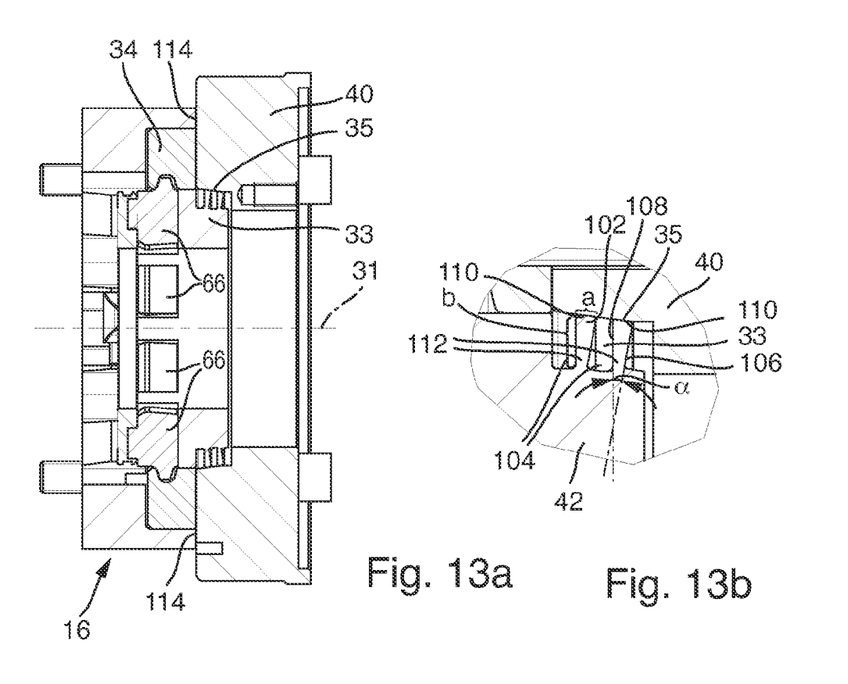

The section shown in FIG. 13a corresponds essentially to the section according to FIG. 6, the tension tube and tension adapter not being illustrated in FIG. 13a. Contrary to FIG. 6, FIG. 13a illustrates the chuck-side chuck receptacle 40 to which the chucking ring 34 is secured.

It becomes clear from FIGS. 13a and 13b that the securing system 10 has a centering device 100 which comprises the conical portion 33 on the securing-device side and the counter conical portion 35 on the chuck side.

As becomes clear particularly, from FIG. 6 and FIGS. 13a and 13b, the conical portion 33 is formed by wall portions 102 running essentially parallel to one another. Overall, in the embodiment shown in FIG. 13, two wall portions are provided which run continuously in a ring-like manner. The wall portions 102 are formed in one piece with the basic body 42. The wall portions 102 can be implemented by indentations 104 being introduced into the basic body 42. As becomes clear particularly from FIG. 13b, the wall portions 102 have in each case a top side 106 and an underside 108. The top side can run parallel to the underside. It becomes clear from FIG. 13b, however, that the top side 106 and the underside 108 are designed in cross section to run in a wedge-shaped manner with respect to the longitudinal mid-axis. The top side 106 and underside 108 form a wedge angle α in the region of 10°. The underside 108 runs essentially perpendicularly to the longitudinal mid-axis 31. The top side 106 is inclined correspondingly. According to the invention, it is also conceivable that the top side 106 runs perpendicularly to the longitudinal mid-axis and the underside 108 is inclined correspondingly. It is likewise conceivable that both sides run so as to be inclined correspondingly to the longitudinal mid-axis 31. The radially outer surface areas 110 of the wall portions 102 lie in a conical curved plane. The wall portions 102 merge in the foot region 112 into the basic body 42.

The chuck 14 or its chuck receptacle 40 has the counter conical portion 35 which is designed to match the conical portion 33. The design is such that, when the chuck 14 is moved axially toward the securing device 16, first the surface areas 110 of the wall portions 102 come to bear against the counter conical portion 35. After the surface areas 110 have come to bear against the counter conical portion 35, the chuck 14 can then be moved further on in the axial direction until the chuck 14 or its chuck receptacle 40 comes to bear against the securing device 16 or its basic body 42. For this purpose, the securing device 16 or its basic body 42 provides a stop 114. The stop 114 is formed by that end face of the basic body 42 which faces the chuck 14 and which runs in a ring-like manner. This stop 114 can be seen clearly particularly from FIG. 8a.

The draw-in force by way of which the chuck 14 is loaded in the axial direction against the securing device 16 is provided via the displacement of the chucking slides 66 into their locking position, as explained initially.

On account of the elastic flexibility of the conical portion 33 or of its wall portions 102 in the axial direction, defined bearing of the chuck 14 against the stop 114 of the securing device 116 can be ensured. In addition, functionally reliable centering can take place.

Figure 14A:
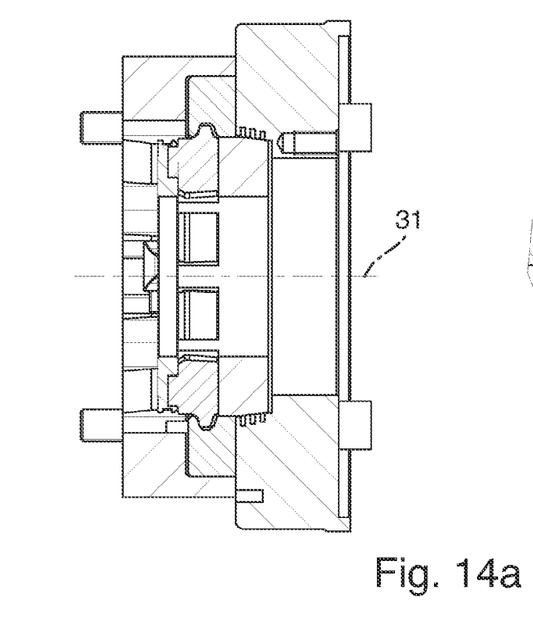
FIG. 14a shows a section corresponding to FIG. 13a through another embodiment.
Figure 14B:
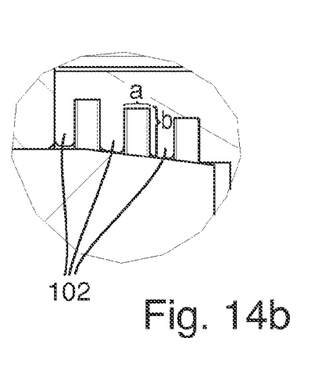

In the embodiment shown in FIGS. 14a and 14b, it is not the conical portion 33, but the counter conical portion 35 which has wall portions 102 which run parallel to one another and which are correspondingly flexible in the axial direction. The conical portion 33, in contrast to this, has a closed surface. On account of the wall portions 102 which can be seen clearly in FIG. 14b, what is also achieved here is that, after the conical portion 33 has come to bear against the counter conical portion 35, the chuck can be displaced at least to some extent further in the axial direction on account of the axial force, until the chuck 14 comes to bear against the stop 114.

As becomes clear particularly from FIG. 13b and FIG. 14b, the ratio of the spacings a between the individual wall portions 102 to their radial extent b is in the range of 1:2 to 1:5. This results in advantageous elastic properties of the wall portions 102.

Figures 15A, 15B:
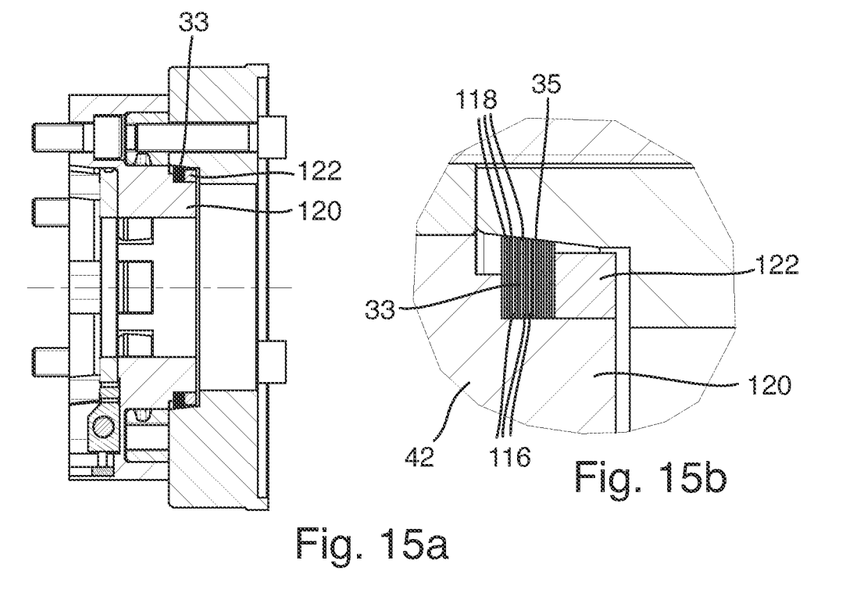

In the embodiment according to FIG. 15, the conical portion 33 is formed by lamellae 116 lying parallel to one another. The radially outer free end faces 118 of the lamellae serve for bearing against the counter conical portion 35. The individual lamellae 116 are formed by annular disks which are placed onto a bolt portion 120 of the basic body 42 and are held on the basic body 42 via a securing nut 122. The individual lamellae 116 have a central hole into which the bolt portion 120 engages. The outside diameter of the individual lamellae 116 slightly decreases from axially inside to axially outside so as to form an overall conical surface area. In order to obtain an exact conical surface area, it is conceivable that the surface area of the lamellae 116 arranged on the basic body 42 is remachined.

Figures 16A, 16B:
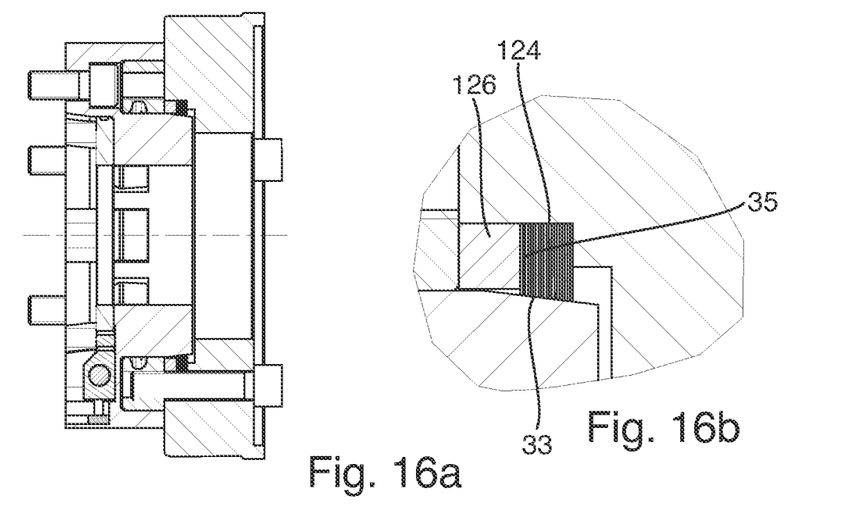

In FIG. 16, contrary to FIG. 15, the lamellae 116 are not provided on the conical portion 33, but instead on the counter conical portion 35. The lamellae 116 are likewise designed as annular disks, the conical surface area being formed here by the radially inner end faces of the lamellae 116. For this purpose, the lamellae 116 are inserted into a clearance 124 provided on the chuck body and are secured there by means of a securing ring 126.

As becomes clear from FIGS. 15 and 16, the lamellae 116 have a thickness of approximately 0.5 mm to 1 mm. Overall, around fifteen lamellae 116 lying one on the other are provided. The lamellae 116 afford the advantage that they are comparatively dimensionally stable under the action of forces in the radial direction. The lamellae 116 are comparatively pliable under the action of forces in the axial direction. Consequently, after the counter conical portion 35 or the conical portion 33 has come to bear against the corresponding end faces of the lamellae 116, these are deformed elastically in the axial direction until the chuck 14 or the chuck receptacle 40 comes to bear against the stop 114.

The invention claimed is:

1. A system for securing a power-operable chuck on a rotating spindle of a machine, the system comprising: a securing device having: a body; a rotary member being arranged so as to run concentrically about a longitudinal mid-axis of the securing device, and at least one chucking slide provided and being arranged in the body so as to be guided displaceably in only a radial direction, wherein the at least one chucking slide is directly motionally coupled to the rotary member, a power-operable chuck having: chuck jaws, and a tension adapter motionally coupled to the chuck jaws, wherein a tension tube provided on a machine side that is coupleable to the tension adapter, wherein when the rotary member is rotated, the at least one chucking slide changes its radial position, so that, in a chucking position, the at least one chucking slide loads the chuck in an axial direction against the securing device, and in a release position, the at least one chucking slide actuates coupling portions of the tension adapter or the tension tube in such a way that the tension adapter can be removed from the tension tube.

2. The system of claim 1, wherein the body includes a chuck reception portion, and, in a locking position remote from the release position, the at least one chucking slide engages into the chuck reception portion for locking the chuck.

3. The system of claim 2, wherein a portion of the at least one chucking slide which engages into the chuck reception portion has drawn-in slopes.

4. The system of claim 1, wherein the body includes centering means for centering the chuck.

5. The system of claim 1, further comprising, a control means to rotate the rotary member, the control means motionally coupled to the rotary member and displaceable tangentially with respect to the rotary member.

6. The system of claim 5, wherein the control means has a spindle bore, and in that an adjusting screw is provided, via which the control means can be displaced.

7. The system of claim 1, wherein the rotary member comprises control curves or control cams, and in that the at least one chucking slide has at least one control cam or a control curve.

8. The system of claim 1, wherein the body has centering means for centering the securing device on the rotating spindle.

* * * * *